United States Patent [19]

Katzoka

[11] Patent Number: 4,702,394

[45] Date of Patent: Oct. 27, 1987

[54] DISPERSING SUPPLY DEVICE IN AUTOMATIC WEIGHING APPARATUS

[75] Inventor: Koichi Katzoka, Kurita, Japan

[73] Assignee: Kabushiki Kaisha Ishida Koki Seisakusho, Kyoto, Japan

[21] Appl. No.: 543,328

[22] Filed: Oct. 19, 1983

[30] Foreign Application Priority Data

Oct. 19, 1982 [JP] Japan .................. 57-157752[U]

[51] Int. Cl.$^4$ .................. F16B 1/00; G01G 13/00; G01G 17/04
[52] U.S. Cl. .................. 222/77; 177/DIG. 11; 222/173; 222/196; 248/678; 403/353
[58] Field of Search .................. 222/77, 56, 173, 609, 222/610, 196; 177/DIG. 11; 403/407.1, 353, 349, 373; 248/678, 638, 637, 405.1, 406.1, 408.1, 331, 334

[56] References Cited

U.S. PATENT DOCUMENTS

| | | | |
|---|---|---|---|
| 1,276,312 | 8/1918 | Ballenberg | 403/407 |
| 1,432,349 | 10/1922 | McFarland | 403/407 |
| 2,347,049 | 4/1944 | Green | 403/407 X |
| 3,104,901 | 9/1963 | Potter | 248/637 X |
| 3,113,358 | 12/1963 | Zell et al. | 403/407 X |
| 3,366,280 | 1/1968 | Sampson et al. | 222/173 |
| 4,317,416 | 3/1982 | Baum et al. | 403/407.1 X |
| 4,402,426 | 9/1983 | Faulkner et al. | 222/77 |
| 4,422,277 | 12/1983 | Bains | 403/407 X |
| 4,454,924 | 6/1984 | Minamida | 177/DIG. 12 |
| 4,470,716 | 9/1984 | Welch | 403/407.1 X |

FOREIGN PATENT DOCUMENTS 2085172 4/1982 United Kingdom .

OTHER PUBLICATIONS

European Search Report, completed 1/27/84, by Examiner Pissenberger at Vienna.

Primary Examiner—Joseph J. Rolla
Assistant Examiner—Kevin P. Shaver
Attorney, Agent, or Firm—Staas & Halsey

[57] ABSTRACT

A dispersing supply device in an automatic weighing apparatus includes a base plate, a vibrator supported on the base plate by a pair of springs, and a trough supported on the vibrator by groups of leaf springs, the trough being vibrated by the vibrator so as to convey articles from one end to the other thereof. The dispersing supply device, one provided for each of a plurality of weighing machines, is disposed between the corresponding weighing machine and a dispersing table so as to receive articles from the table and supply them to the weighing machine via the trough. The base plate is formed to include a mounting slot having a first portion of prescribed width and an elongate second portion narrower in width than the first portion. A mounting table to which the dispersing supply device is attached is provided with a projecting pin having a head portion. After the pin is passed through the first portion of the mounting slot provided in the base plate, the base plate is caused to slide to engage the pin with the second portion of the mounting slot, thereby attaching the dispersing supply device to the mounting table.

5 Claims, 5 Drawing Figures

DISPERSING SUPPLY DEVICE IN AUTOMATIC WEIGHING APPARATUS

BACKGROUND OF THE INVENTION

This invention relates to a dispersing supply device in an automatic combinatorial weighing apparatus.

A conventional combinatorial type weighing apparatus operates by supplying a plurality of weighing machines with articles to be weighed, the weighing machines being arrayed in a circle about the periphery of a centrally located dispersing table, combining the weight values provided by the weighing machines into a number of different combinations, selecting from among these combinations a so-called "optimum combination" whose total weight value is equal or closest to a predetermined weight, and discharging from the weighing machines only those articles corresponding to the selected optimum combination, thereby providing a batch of the articles having a weight approximately equal to the predetermined weight. Such an automatic weighing apparatus includes radially disposed dispersing supply devices equal in number to the weighing machines for dispersing the articles radially outward from the dispersing table and supplying them to the weighing machines. In the prior art arrangement, each dispersing supply device, which includes a trough and a trough vibrator, is fixedly secured on a mounting base. Accordingly, cleaning the trough or the check and adjustment of the vibrator requires that the device be detached from the mounting base. With the prior-art arrangement, however, detaching and reattaching the dispersing supply device is a very troublesome operation.

SUMMARY OF THE INVENTION

The object of the present invention is to provide a dispersing supply device for an automatic weighing apparatus which can be attached and detached with ease to facilitate the cleaning of the trough and the check and adustment of the vibrator.

According to the present invention, the foregoing object is attained by providing a dispersing supply device having a base plate which is formed to include a mounting slot having a first portion of prescribed width and an elongated second portion of narrower width than the first portion. A mounting table to which the dispersing supply device is attached is provided with a projecting pin having a head portion. After the pin is passed through the first portion of the mounting slot provided in the base plate, the base plate is caused to slide to engage the pin with the second portion of the mounting slot, thereby attaching the dispersing supply device to the mounting table.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
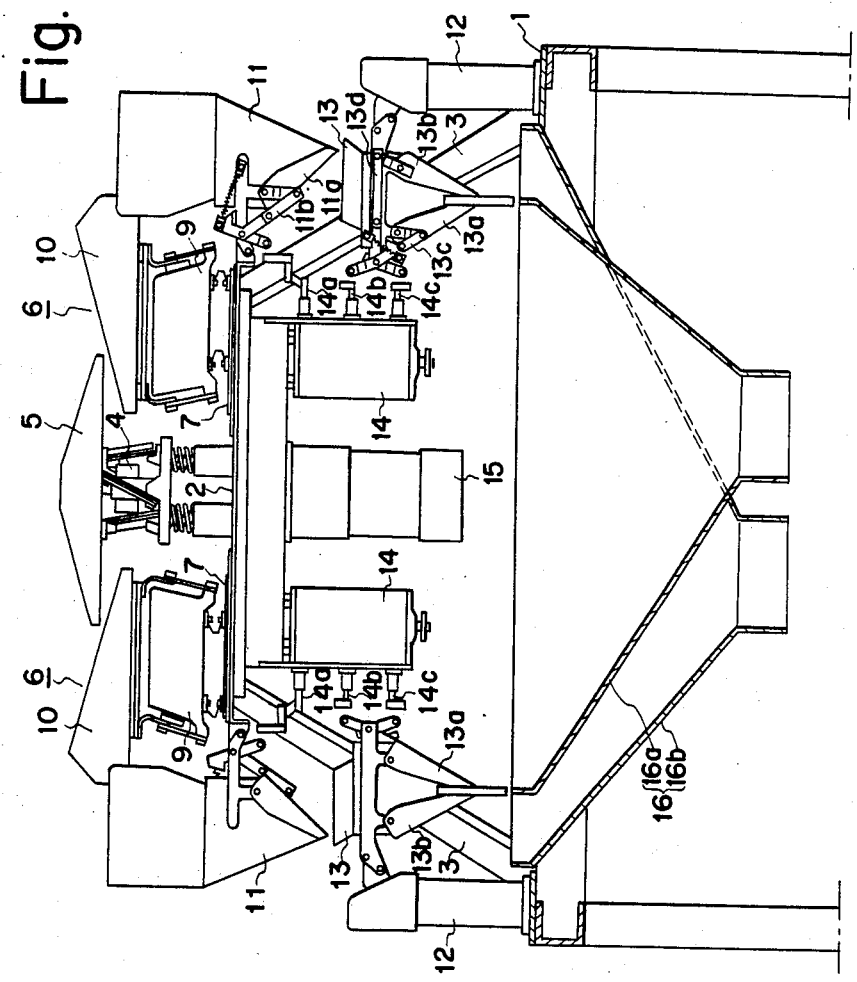
FIG. 1 is a sectional view showing the entirety of an automatic weighing apparatus in which an embodiment of a dispersing supply device according to the present invention is incorporated.

FIG. 1 illustrates the overall construction of an automatic weighing apparatus to which the present invention is applied.

Figure 2:
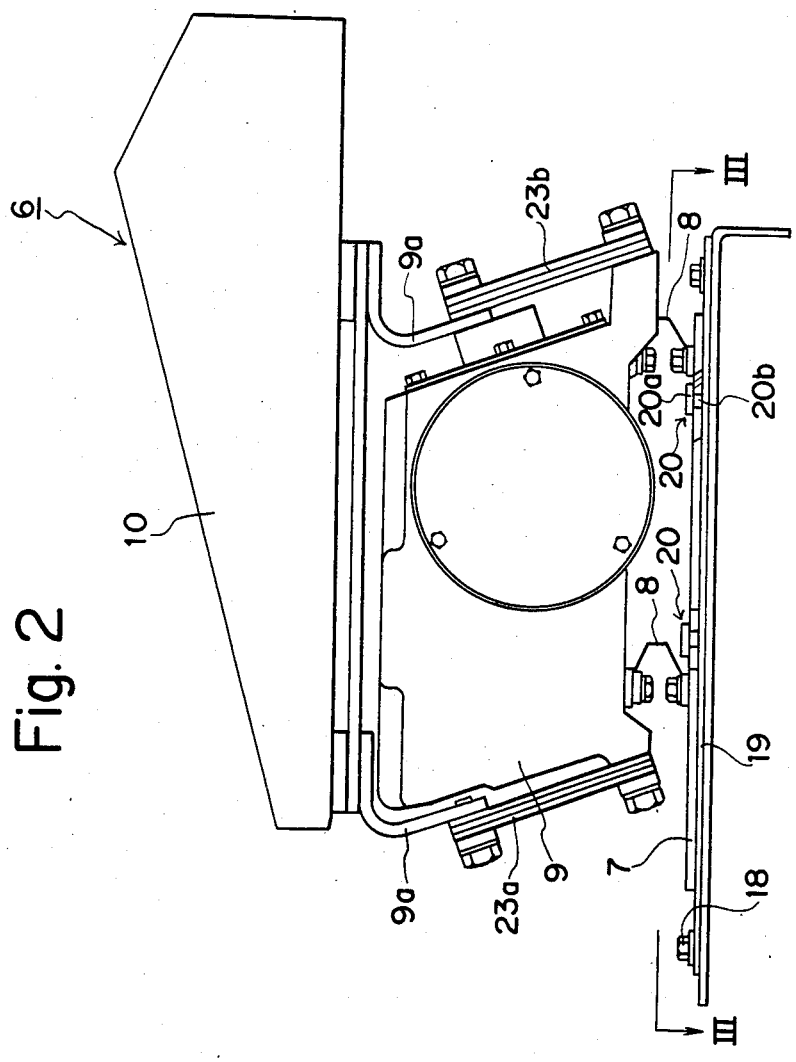
FIG. 2 is an enlarged side view illustrating the principal portion of the dispersing supply device shown in FIG. 1.

The automatic weighing apparatus comprises a base 1, a mounting table 2 supported on and positioned above the central portion of the base 1 by a plurality of supporting legs 3, an article dispersing table 5 supported centrally on the mounting table 2 by a vibrator unit 4, and a plurality of dispersing supply devices 6 disposed radially around the dispersing table 5. As shown in FIG. 2, each dispersing supply device 6 comprises a base plate 7, a vibrator unit 9 supported on the base plate 7 by a pair of U-shaped leaf springs 8, and a trough 10. The trough 10 is fixedly secured to a pair of mounting members 9a each of which is attached to the upper end of a group of leaf springs 23a and 23b. The lower end of one group of leaf springs 23a is secured to the front end of the vibrator unit 9, while the lower end of the other group of leaf springs 23b is secured to the rear end of the vibrator unit.

Returning to FIG. 1, the automatic weighing apparatus further includes pool hoppers 11, equal in number to the dispersing supply devices 6, mounted on the peripheral edge of the mounting table 2 below the supply troughs 10 of the corresponding dispersing supply devices 6, weighing machines 12, equal in number to the dispersing supply devices 6 (and, hence, the pool hoppers 11), mounted on the base 1 as a circular array in radial alignment with the dispersing supply devices 6 or the pool hoppers 11, respectively, and a plurality of weighing hoppers 13 attached respectively to the weighing machines 12 and located below the pool hoppers 11, respectively. Each pool hopper 11 is provided with a gate 11a, and each weighing hopper 13 is provided with a pair of gates 13a, 13b. Hopper actuating units 14, equal in number to the hopper sets, are attached to the bottom of the mounting table 2 at positions corresponding to the hopper sets, each of which is composed of a pool hopper 11 and underlying weighing hopper 13. Each hopper actuating unit 14 comprises a push rod 14a which, when extended, operates through a link mechanism 11b to open the gate 11a of the pool hopper 11, and push rods 14b 14c which, when extended, operate through respective link mechanisms 13c 13d to open the gates 13a 13b of the corresponding weighing hopper 13. Numeral 16 denotes a collecting chute having a wide upper opening for receiving the articles discharged from the weighing hoppers 13. Since each of the weighing hoppers 13 has two gates 13a 13b, the collecting chute 16 is composed of an inner chute 16a for receiving the articles discharged from the gate 13a of each weighing hopper 13 and an outer chute 16b for receiving the articles discharged from the gate 13b of each weighing hopper 13.

Figure 3:
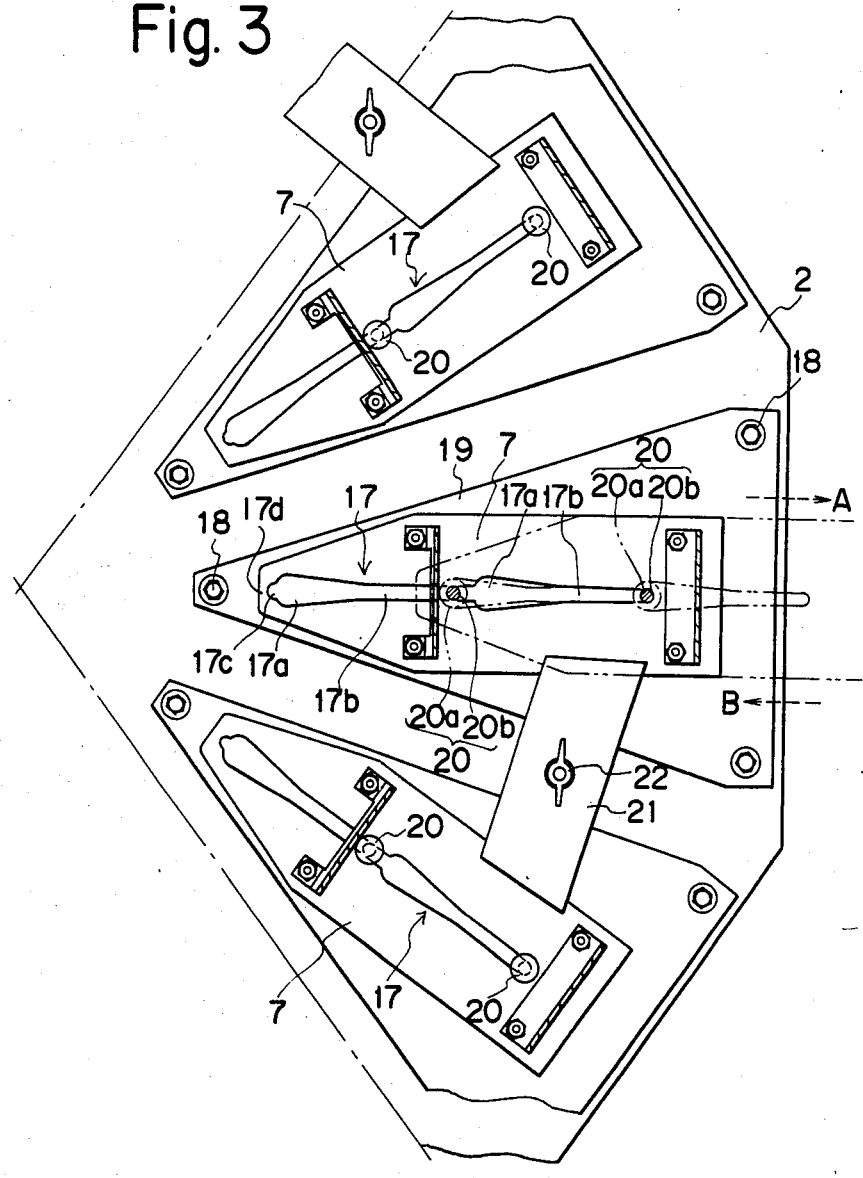
FIG. 3 is a plan view taken along line III—III of FIG. 2.

As shown in FIGS. 2 and 3, the base plate 7 of each dispersing supply device 6 is formed to include a mounting slot 17 extending in the longitudinal dimension of the base plate 7 and radially from the weighing apparatus. The mounting slot 17 includes two wide portions 17a, and two comparatively slender elongate portions 17b contiguous with the wide portions 17a. The upper surface of the mounting table 2 on which the base plate 7 is disposed (i.e., in the illustrated embodiment, the upper surface of a plate member 19 fixedly secured to the mounting table by bolts 18) is provided with two projecting pins 20 each comprising a head portion 20a of a large diameter and a shaft portion 20b of a small diameter. The pins 20 engage with the two slender portions 17b of the mounting slot 17 provided in the base plate 7. The design is such that the distance between the two wide portions 17a of the mounting slot 17 and the spacing between the two pins 20 is equal, and such that the wide portions 17a are large enough to allow passage of the pin head portions 20a therethrough.

In the illustrated embodiment, a clamping plate 21 is provided on the mounting table between adjacent base plates 7. By tightening a thumb screw 22, the clamping plate 21 is secured to the mounting table 2, thereby fixedly clamping the base plates 7 on either side of the clamping plate 21 to the mounting table 2. Each of the pins 20 is so designed that the shaft portion 20b thereof has a length slightly greater than the thickness of the base plate 7, thereby allowing the base plate 7 to slide smoothly between the head portion 20a of the pin and the mounting table 2 (plate member 19). In the illustrated embodiment, only one clamping plate 21 is provided between each adjacent pair of base plates 7.

In accordance with the foregoing construction, each dispersing supply device 6 for supplying a corresponding pool hopper 11 with articles from the dispersing table 5 is attached to the mounting table 2 by engaging the pair of pins 20, whose head portions 20a project from the upper surface of the mounting table 2, with the corresponding slender portions 17b of the mounting slot 17 formed in the base plate 7. Since the mounting slot 17 is formed to include the two wide portions 17a having the same spacing as the pair of pins 20 and a lateral width dimensioned to allow the pin head portions 20a to pass therethrough, the dispersing supply device 6 may be detached from the mounting table 2 in the following manner. First, the thumb screw 22 is loosened, followed by removing the clamping plate 21 from the base plate 7 or rotating the clamping plate 21 through an angle of about 90°. Then, as indicated by the phantom lines in FIG. 3, the base plate 7, namely the dispersing supply device 6, is pulled in the direction of the arrow A while the pin shaft portions 20b engage with the slender portions 17b of the slots 17. Thus, the entire body of the dispersing supply device 6 slides in linear fashion while being guided by the pin shafts mating with the slender portions of the slots. When the wide portions 17a of the mounting slot 17 come into positional alignment with the pins 20, the slot 17 may be disengaged from the pins 20. This is accomplished merely by lifting the dispersing supply device 6 from the mounting table 2, thereby detaching the former from the latter.

To attach the dispersing supply device to the mounting table 2, the wide portions 17a of the mounting slot 17 in base plate 7 are aligned with the pins 20, the base plate 7 is depressed so that the pins 20 will pass through the wide portions 17a of the slot 17, and the base plate 7 is caused to slide in the direction of arrow B in FIG. 3 to engage the pin shaft portions 20b with the slender portions 17b of the mounting slot 17. As shown in the illustrated embodiment, the dimensions should be such that the dispersing supply device 6 arrives at a predetermined position when it is caused to slide to bring one of the pins 20 into abutting contact with the end portion of the corresponding slender portion 17b of the slot 17. This will make it unnecessary to reposition the dispersing supply device after it has been attached. Further, by arranging it so that the dispersing supply device 6 slides radially outwardly from the apparatus (namely in the direction A) when being detached, as in the illustrated embodiment, the detaching operation is facilitated and the positions at which the dispersing supply devices 6 are disposed can be brought close to the center of the mounting table 2, thereby making it possible to reduce the overall size of the automatic weighing apparatus.

In the illustrated embodiment, the springs 8 interconnecting the base plate 7 and vibrator unit 9 of the dispersing supply device 6 are leaf springs having a U-shaped cross section the width direction of which perpendicularly intersects the direction in which the articles to be weighed are supplied (i.e., the longitudinal direction of the trough or base plate). The springs 8 resiliently support the vibrator unit 9 to prevent vibration from being transmitted to the weighing apparatus proper through the mounting table 2.

Figure 4:
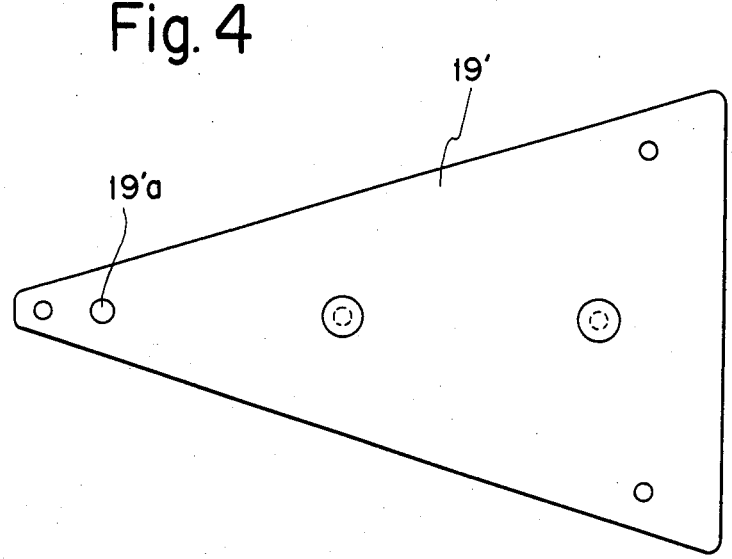
FIGS. 4 and 5 are plan and side views, respectively, of a plate member according to a second embodiment of the present invention.
Figure 5:
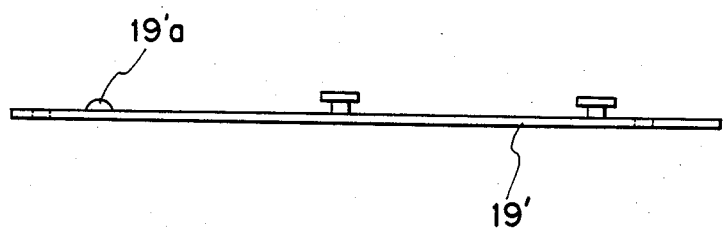

FIG. 4 is a plan view of a plate member 19' according to another embodiment of the present invention. In this embodiment, the plate member 19' substantially has the form of an isosceles triangle and is formed to include a circular projection 19'a on the central line of the triangle and adjacent the apex thereof. The plate member 19', when substituted for the plate 19 in FIG. 3, has its circular projection 19'a fitted into a semicircular recess 17c formed in the head of the mounting slot 17 provided in the base plate 7. With such a construction, the mounting slot 17 of the base plate 17 is engaged at both extremities thereof, namely at the inward end (the end directed toward the center of the weighing apparatus) by the circular projection 19'a, and the outward end (the end directed away from the center of the weighing apparatus) by one of the pins 20. This enhances the support of the base plate 7 and makes it possible to dispense with the clamping plate 21 and thumb screw 22. It should be noted that when the dispersing supply device 6 slides in the direction A or the direction B, a bridging portion 17d at the head of the base plate 7 rides on the circular projection 19'a owing to the flexibility of the plate and a clearance which results from the difference between the length of the pin shaft portion 20b and the thickness of the base plate 7. The circular projection 19'a acts as a detent, and the resistance to sliding offered thereby serves to retain the dispersing supply device 6.

In accordance with the present invention as described and illustrated hereinabove, the radially disposed dispersing supply devices for supplying articles to the weighing hoppers of plural weighing machines from a centrally located dispersing table in an automatic weighing apparatus are adapted so as to be readily attached to and detached from a mounting table. This facilitates the cleaning of the troughs and the check and adjustment of the vibrators constituting the dispersing supply devices and permits these dispersing supply devices to be attached or detached even while the weighing apparatus is in operation.

Many apparently widely different embodiments of the present invention can be made without departing from the spirit and scope thereof, thus, it is to be understood that the invention is not limited to the specific embodiments thereof except as defined in the appended claims.

What I claim is:

1. A dispersing supply apparatus including a plurality of dispersing supply devices, disposed at the periphery of a dispersing table and mounted on a support structure for supplying a plurality of weighing hoppers with articles to be weighed, the weighing hoppers being arrayed about the periphery of said dispersing supply devices, each of said dispersing supply devices comprising:

a base plate, integral with said dispersing supply device, having at least one mounting slot with two first, wide portions and two second, narrow elongated portions contiguous to the first, wide portions, said base plate being aligned in a direction from the dispersing table to the associated weighing hopper;

a plate member to which said base plate is attached, said plate member mounted on the support structure;

pins projectively provided on said plate member, each having a head portion of a first diameter and a shaft portion of a second diameter, said first diameter being larger than said second diameter so that the head portions of said pins are inserted in said first portion of said slot and so that said shaft portions of said pins are engaged with the second portion of said mounting slot by sliding said base plate; and releasable retaining means spanning adjacent base plates for inhibiting movement of said dispersing supply devices away from their operation position when said dispersing supply devices are in use, by inhibiting movement of said dispersing supply devices relative to the support structure in the direction from the dispersing table to the weighing hopper associated with said dispersing supply devices.

2. A dispersing supply apparatus according to claim 1, wherein each of said dispersing supply devices further comprises:

first spring means;

vibrating means supported on said base plate by said first spring means;

second spring means; and a trough, supported on said vibrating means by said second spring means, for being vibrated by said vibrating means through said second spring means.

3. A dispersing supply apparatus according to claim 1, wherein said dispersing supply devices are arrayed in a radial manner about the center of the dispersing table.

4. A dispersing supply apparatus according to claim 1, wherein said releasable retaining means comprises:

a clamping plate which spans only a portion of said base plate for each of two adjacent ones of said dispersing supply devices; and screw-threaded means for urging said clamping plate towards the support structure so as to clamp said base plate portions thereto.

5. A dispersing supply apparatus according to claim 1, wherein for each of said dispersing supply devices, a spherically rounded projection is provided on said plate member; and a complementary recess provided at the end of said slot on said base plate of each of said dispersing supply devices, which is nearest to the dispersing table, said rounded projection fitting into said complementary recess when said dispersing supply device is in its operative position.

* * * * *

UNITED STATES PATENT AND TRADEMARK OFFICE
CERTIFICATE OF CORRECTION

PATENT NO. : 4,702,394

DATED : OCTOBER 27, 1987

INVENTOR(S) : KOICHI KATZOKA

It is certified that error appears in the above-identified patent and that said Letters Patent is hereby corrected as shown below:

```
FRONT PAGE [56] "References Cited", after line 5, insert

--2,643,586  6/53  Colvin  ..........  403/353X--;

after line 8, insert

--4,258,464  3/81  Ullman, Jr.  .....  403/353X--;

after line 12, insert

--4,553,484  11/85  Cox  ............  403/353X--.

Col. 2, line 51, "14b 14c" should be --14b and 14c--;
        line 53, "13a 13b" should be --13a and 13b--;
        line 57, "13a 13b" should be --13a and 13b--.
```

Signed and Sealed this

Fifth Day of April, 1988

Attest:

DONALD J. QUIGG

*Attesting Officer*       *Commissioner of Patents and Trademarks*